(12) United States Patent
Wang et al.

(10) Patent No.: US 11,077,706 B2
(45) Date of Patent: Aug. 3, 2021

(54) CARBON FIBER SPOKE AND MANUFACTURING METHOD THEREOF

(71) Applicant: XIAMEN HONGJI WEIYE INDUSTRIAL CO., LTD, Xiamen (CN)

(72) Inventors: Jingnan Wang, Xiamen (CN); Hailin Huang, Xiamen (CN); Feihu Wang, Xiamen (CN); Kun Wang, Xiamen (CN); Shuhui Liao, Xiamen (CN); Renbao Lin, Xiamen (CN)

(73) Assignee: XIAMEN HONGJI WEIYE INDUSTRIAL CO., LTD, Xiamen (CN)

( * ) Notice: Subject to any disclaimer, the term of this patent is extended or adjusted under 35 U.S.C. 154(b) by 542 days.

(21) Appl. No.: 16/071,487

(22) PCT Filed: May 23, 2018

(86) PCT No.: PCT/CN2018/088034
§ 371 (c)(1),
(2) Date: Jul. 20, 2018

(87) PCT Pub. No.: WO2019/019785
PCT Pub. Date: Jan. 31, 2019

(65) Prior Publication Data
US 2020/0376887 A1 Dec. 3, 2020

(30) Foreign Application Priority Data

Jul. 25, 2017 (CN) .......................... 201710610964.1
Dec. 6, 2017 (CN) .......................... 201711277891.5

(51) Int. Cl.
*B60B 1/04* (2006.01)
*B60B 1/02* (2006.01)
*B60B 5/02* (2006.01)

(52) U.S. Cl.
CPC ............ *B60B 1/045* (2013.01); *B60B 1/0261* (2013.01); *B60B 1/041* (2013.01); *B60B 1/042* (2013.01);
(Continued)

(58) Field of Classification Search
CPC .. B60B 1/003; B60B 1/02; B60B 1/04; B60B 1/041; B60B 1/042; B60B 1/043;
(Continued)

(56) References Cited

U.S. PATENT DOCUMENTS 4,729,605 A * 3/1988 Imao ......................... B60B 5/02
                   301/104
5,110,190 A * 5/1992 Johnson ..................... B60B 5/02
                   301/104
(Continued)

FOREIGN PATENT DOCUMENTS

| CN | 201890082 U | 7/2011 |
| CN | 201941514 U | 8/2011 |

(Continued)

*Primary Examiner* — Jason R Bellinger
(74) *Attorney, Agent, or Firm* — Bayramoglu Law Offices LLC

(57) ABSTRACT

The present invention discloses a carbon fiber spoke and a manufacturing method thereof. The carbon fiber spoke includes a spoke body made of carbon fiber, a screw bushing that is fit and connected with rim and a nut cap bushing that is fit and connected with the hub. Two end parts of the spoke body are provided with solid joints. The outside surface of the solid joint is provided with a first tapered section. The screw bushing and the nut cap bushing are provided with penetrable mounting holes. The hole wall surrounding the mounting hole is provided with a second tapered section. The mounting hole of the screw bushing and the mounting hole of the nut cap bushing are respectively fixed to the two solid joints; the second tapered section of the mounting hole
(Continued)

and the first tapered section of the solid joint are fit and connected together.

17 Claims, 8 Drawing Sheets

(52) U.S. Cl.
CPC .............. *B60B 1/046* (2013.01); *B60B 1/048* (2013.01); *B60B 5/02* (2013.01); *B60B 1/0246* (2013.01); *B60B 2310/228* (2013.01); *B60B 2310/241* (2013.01); *B60B 2310/80* (2013.01); *B60B 2360/3416* (2013.01); *B60B 2900/321* (2013.01); *B60B 2900/323* (2013.01); *B60B 2900/325* (2013.01)

(58) Field of Classification Search
CPC ......... B60B 1/044; B60B 1/045; B60B 1/046; B60B 5/02
See application file for complete search history.

(56) References Cited

U.S. PATENT DOCUMENTS

| | | | | |
|---|---|---|---|---|
| 5,350,221 | A * | 9/1994 | Pearce | B60B 1/003 301/104 |
| 5,779,323 | A * | 7/1998 | Burrows | B60B 1/0246 301/104 |
| 6,036,281 | A * | 3/2000 | Campbell | B60B 1/003 301/104 |
| 7,357,459 | B2 * | 4/2008 | Schlanger | B60B 1/003 301/59 |
| 7,862,128 | B2 * | 1/2011 | Schlanger | B60B 1/003 301/59 |
| 8,657,387 | B2 * | 2/2014 | Schlanger | B60B 1/041 301/104 |
| 2004/0155518 | A1 * | 8/2004 | Schlanger | B60B 5/02 301/58 |
| 2007/0257548 | A1 * | 11/2007 | Schlanger | B60B 21/025 301/58 |
| 2008/0054710 | A1 * | 3/2008 | Spahr | B60B 1/046 301/58 |
| 2015/0306906 | A1 * | 10/2015 | Connolly | B60B 1/006 301/104 |
| 2016/0332481 | A1 | 11/2016 | Spanjers et al. | |
| 2020/0108657 | A1 * | 4/2020 | Cappellotto | B60B 21/062 |

FOREIGN PATENT DOCUMENTS

| | | |
|---|---|---|
| CN | 202294038 U | 7/2012 |
| CN | 103448465 A | 12/2013 |
| CN | 205273028 U | 6/2016 |
| CN | 106904046 A | 6/2017 |
| CN | 106926635 A | 7/2017 |
| CN | 107471903 A | 12/2017 |
| CN | 107972403 A | 5/2018 |

\* cited by examiner

CARBON FIBER SPOKE AND MANUFACTURING METHOD THEREOF

CROSS REFERENCE TO RELATED APPLICATIONS

This application is the national phase entry of International Application No. PCT/CN2018/088034, filed on May 23, 2018, which is based upon and claims priority to Chinese Patent Application No. 201710610964.1, filed on Jul. 25, 2017 and Chinese Patent Application No. 201711277891.5, filed on Dec. 6, 2017 the entire contents of which are incorporated herein by reference.

TECHNICAL FIELD

The invention relates to a vehicle spoke, in particular to a carbon fiber spoke and manufacturing method thereof.

BACKGROUND

One end of the vehicle spoke is matched and connected with the rim and the other end is matched and connected with the hub. The traditional vehicle spoke is made of stainless steel, one end of which is bent to hook up to the rim, the other end is bent to hook up to the hub. Use of stainless steel leads to heavy weight, high cost and low production efficiency. In view of the above-mentioned shortcomings, the solutions were proposed:

For example, CN205273028U, a carbon fiber spoke, includes a spoke body. One end of the spoke body is connected with a first fitting that can be fit and connected with the rim, the other end is connected with a second fitting that can be fit and connected with a hub. The spoke body is made of a carbon fiber material. The connection between the end portion of the spoke body and the fitting adopts the bonding mode. In the process of using, the hub and the rim can produce tensile forces to act upon the fittings, which makes the fittings easy to be pulled away from the spoke body, resulting in the separation of the two parts, the short service life, the inconvenience of manufacturing and high costs.

For another example, CN103448465A, a spoke fixing member used for a carbon fiber bicycle rim, includes a fixed portion and a contacting portion. The fixed portion is formed by extending axially along a virtual axis. The contacting portion is formed at one end of the fixed portion and extends radially, taking the virtual axis as an axle center. The spoke fixing member is provided with a location hole. The location hole is sleeved on the spoke. The contacting portion is contacted with the carbon fiber bicycle rim. When the spoke transfers torque to drive the carbon fiber bicycle rim, the spoke fixing member can fix the spoke, which makes the spoke unable to move relative to the carbon fiber ring. The structures of the spoke for bicycle are extremely complex, which is inconvenient to manufacture and assemble, and manufacturing cost is high.

SUMMARY

The present invention provides a carbon fiber spoke and manufacturing method thereof, which overcomes the shortcomings of a carbon fiber spoke in the background technology.

The first technical solution that the present invention solves the technical problems is that:

A carbon fiber spoke, includes a spoke body made of carbon fiber, a screw bushing that can be fit and connected with rim and a nut cap bushing that can be fit and connected with the hub. Two end parts of the spoke body are provided with solid joints. The outside surface of the solid joint is provided with a first tapered section with a small diameter close to the spoke body and a large diameter away from the spoke body. The screw bushing and the nut cap bushing are provided with a penetrable mounting hole. The hole wall surrounding the mounting hole is provided with a second tapered section. The mounting hole of the screw bushing and the mounting hole of the nut cap bushing are respectively fixed to the two solid joints. The second tapered section of the mounting hole and the first tapered section of the solid joint are fit and connected together.

In an embodiment, the first tapered section and the second tapered section are both truncated cone walls.

In an embodiment, the outside surface of the solid joint forms the first tapered section, and the hole wall surrounding the mounting hole forms the second tapered section.

In an embodiment, the two end parts of the spoke body are wrapped by gauze carbon prepreg and solidified to form solid joint parts that are fixedly sleeved on the end parts of the spoke body. A solid joint is formed from the solid joint part through a material removal processing method.

In an embodiment, the mounting hole of the screw bushing, the mounting hole of the nut cap bushing and the two solid joints are respectively sleeved together in a tight fit to form a fixed sleeve connection.

In an embodiment, the screw bushing and nut cap bushing are made of stainless steel.

The second technical solution that the present invention solves the technical problems is that:

A manufacturing method of carbon fiber spoke includes:

Step 1, producing a spoke body made of carbon fiber, a screw bushing that can be fit and connected with a rim and a nut cap bushing that can be fit and connected with a hub. The screw bushing and the nut cap bushing are provided with penetrable mounting holes. The hole wall surrounding the mounting hole is provided with a second tapered section.

Step 2, sleeving the screw bushing and the nut cap bushing on the spoke body at the end part.

Step 3, fixedly arranging solid joints at the two end parts of the spoke body. The outside surface of each solid joint is provided with a first tapered section with a small diameter close to the spoke body and a large diameter away from the spoke body.

Step 4, moving the screw bushing and the nut cap bushing so that the mounting hole of the screw bushing and the mounting hole of the nut cap bushing are respectively fixedly sleeved on the two solid joints, and the second tapered section of the mounting hole and the first tapered section of the solid joint are fit and connected together.

In an embodiment, the first tapered section and the second tapered section are both truncated cone walls.

In an embodiment, the outside surface of the solid joint forms the first tapered section, and the hole wall surrounding the mounting hole forms the second tapered section.

In an embodiment, in Step 3, the end part of the spoke body is wrapped by gauze carbon prepreg and solidified to form a solid joint part that is fixedly sleeved on the end part of the spoke body. A solid joint is formed from the solid joint part through a material removal processing method.

Compared with the background technology, the technical solution has the following advantages:

During the usage, the forces that the rim and the hub exert on the screw bushing and the nut cap bushing are both tensile forces, which make the second tapered section subjected to an outward acting force relative to the first tapered section. The acting force makes a higher tightness between the solid joint and the screw bushing or the nut cap bushing and a firmer connection, which can avoid the separation of the solid joint from the nut cap bushing or the screw bushing, and can solve the problem that the testing screw bushing of carbon fiber spoke is pulled out. The spoke is light in weight and good in strength, which strengthens the competitiveness of the product. Convenient assembly can reduce manufacturing costs.

The first tapered section and the second tapered section are truncated cone walls, which are easy to process, easy to assemble, and have a strong connection strength.

Two end parts of the spoke body are wrapped by gauze carbon prepreg and solidified to form solid joint parts that are fixedly sleeved on the end parts of the spoke body. A solid joint is formed from the solid joint part through a material removal processing method. The connection strength is high and the processing cost is low.

The mounting hole of the screw bushing, the mounting hole of the nut cap bushing and the two solid joints are respectively sleeved together in a tight fit to form a fixed sleeve connection, which is convenient to assemble and reduces the assembly cost.

The manufacturing method of carbon fiber spoke includes: producing a spoke body, a screw bushing and a nut cap bushing; then sleeving the screw bushing and the nut cap bushing on the spoke body at the end part; then fixedly arranging solid joints at the two end parts of the spoke body; then moving the screw bushing and the nut cap bushing so that the mounting hole of the screw bushing and the mounting hole of the nut cap bushing are respectively fixedly connected on the two solid joints. The assembly is convenient, and the connection strength is high.

BRIEF DESCRIPTION OF THE DRAWINGS

The present invention is further described below with the accompanying drawings and embodiments.

DETAILED DESCRIPTION OF THE EMBODIMENTS

Embodiment 1

Figure 1:
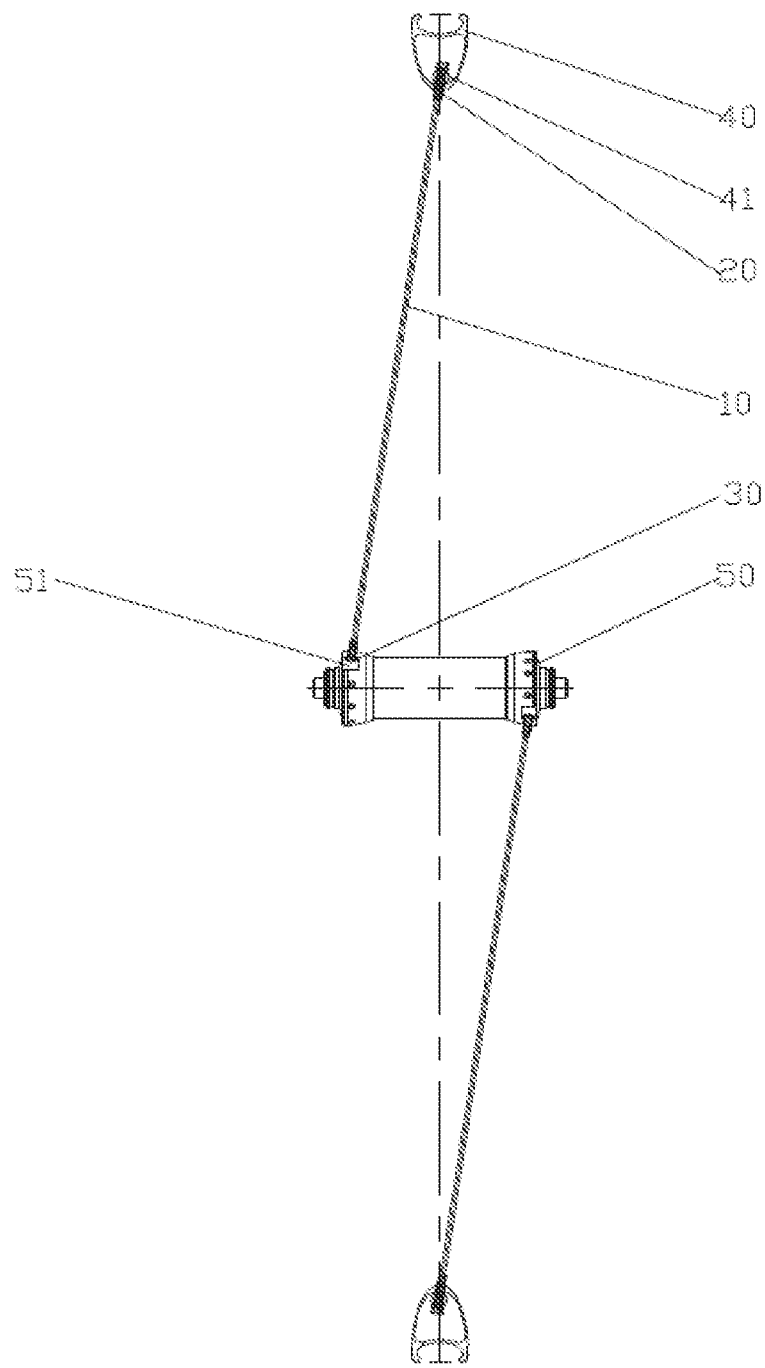
FIG. 1 is a first installation schematic diagram of the spoke of the present invention.

Referring to FIGS. 1 to 7 and FIGS. 11 to 13, a carbon fiber spoke includes a spoke body 10, a screw bushing 20 that can be fit and connected with rim 40 and a nut cap bushing 30 that can fit and connected with the hub 50. Two end parts of the spoke body 10 are fixedly provided with solid joints 60. The outside surface of each solid joint 60 is provided with a first tapered section 61 with a small diameter close to the spoke body and a large diameter away from the spoke body. In the present embodiment, the first tapered section is a truncated cone wall. The outside surface of the solid joint forms the first tapered section. The screw bushing 20 and the nut cap bushing 30 are provided with penetrable mounting holes 70. The hole wall surrounding the mounting hole 70 is provided with a second tapered section. The second tapered section is a truncated cone wall. The hole wall of the mounting hole 70 forms the second tapered section. The mounting hole 70 of the screw bushing 20 and the mounting hole 70 of the nut cap bushing 30 are respectively fixedly sleeved on the two solid joints 60. The second tapered section 71 of the mounting hole 70 and the first tapered section 61 of the solid joint 60 are fit and connected together. The matching is as follows: the taper angle of the first tapered section 61 is equal to the taper angle of the second tapered section 71, or the taper angle of the second tapered section 71 is slightly smaller than the taper angel of the first tapered section 61. The spoke body 10 is made of carbon fiber. The screw bushing 20 and the nut cap bushing 30 are made of stainless steel. The two end parts of the spoke body 10 are wrapped by gauze carbon prepreg and solidified to form solid joint parts that are fixedly sleeved on the end parts of the spoke body. A solid joint 60 is formed by a material removal processing method. In the present embodiment, the mounting hole 70 of the screw bushing 20, the mounting hole 70 of the nut cap bushing 30 and the two solid joints 60 are respectively sleeved together in a tight fit to form a fixed sleeve connection. During the usage, the forces that the rim 40 and the hub 50 respectively exert on the screw bushing 20 and the nut cap bushing 30, are both tensile forces, which make the second tapered section 71 subjected to an outward acting force relative to the first tapered section 61. The acting force makes a higher tightness between the solid joint and the screw bushing or the nut cap bushing and a firmer connection, which can avoid the separation of the solid joint from the nut cap bushing or the screw bushing.

Referring to FIGS. 1 to 4, the outside surface of the screw bushing 20 is provided with at least a thread section 21 and a non-circular section 22. The non-circular section 22 is multiple notches arranged on a cylindrical surface in a circular array. According to the need, a first rotator section 23 can be set between the thread section 21 and the non-circular section 22. The tail end of the thread section 21 can be provided with a chamfering. During installation, the above-mentioned matching connection is realized by the thread section and the nut 41 on the rim 40.

Figure 2:
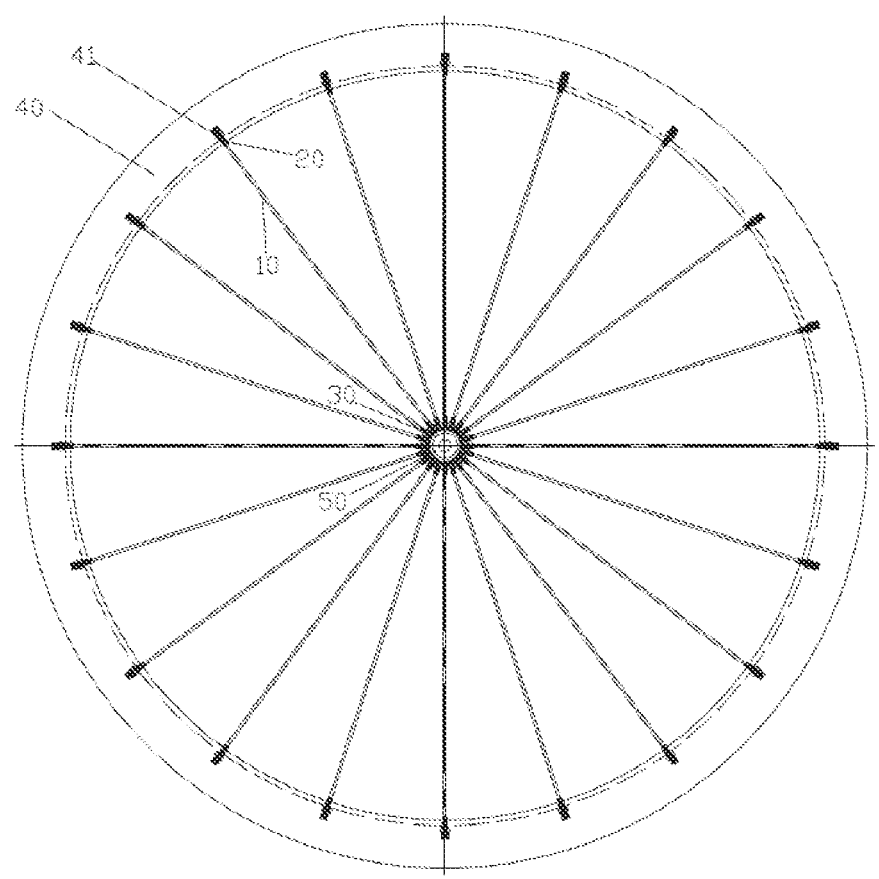
FIG. 2 is a second installation schematic diagram of the spoke of the present invention.
Figure 5:
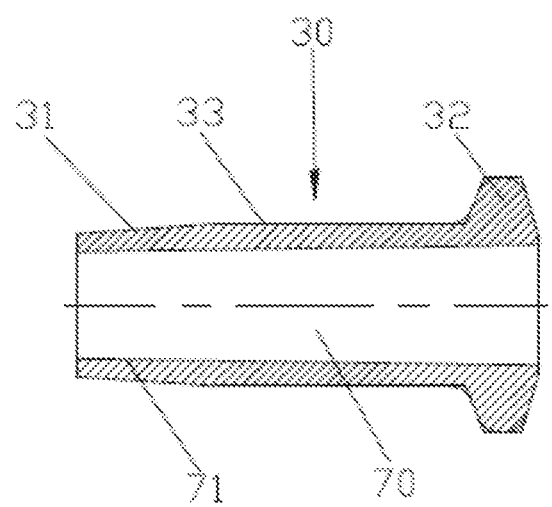
FIG. 5 is a sectional schematic diagram showing the nut cap bushing of Embodiment 1 of the present invention.
Figure 6:
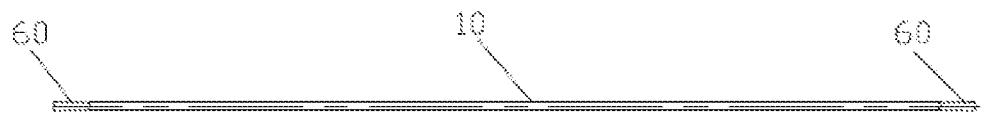
FIG. 6 is a structural schematic diagram showing a spoke body with a solid joint in Embodiment 1 of the present invention.
Figure 7:
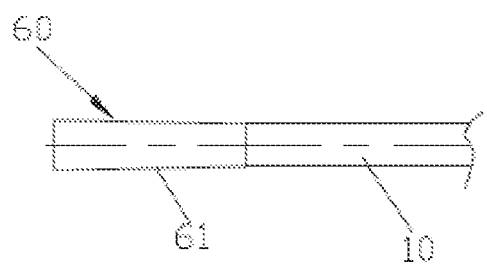
FIG. 7 is a partial enlarged view of FIG. 6.

Referring to FIGS. 1, 2 and 5, the outside surface of the nut cap bushing 30 has a third tapered section 31 and a hanging section 32. The width of the hanging section 32 is larger than the diameter of the third taper section 31, the width of the hanging section 32 is the outer diameter of the hanging section 32. According to the need, the outside surface is also provided with a second rotator section 33 connecting the third tapered section 31 and the hanging section 32. During installation, the above-mentioned matching connection is realized by hanging the hanging section 32 on the hanging slot 51 of the hub 50.

Figure 3:
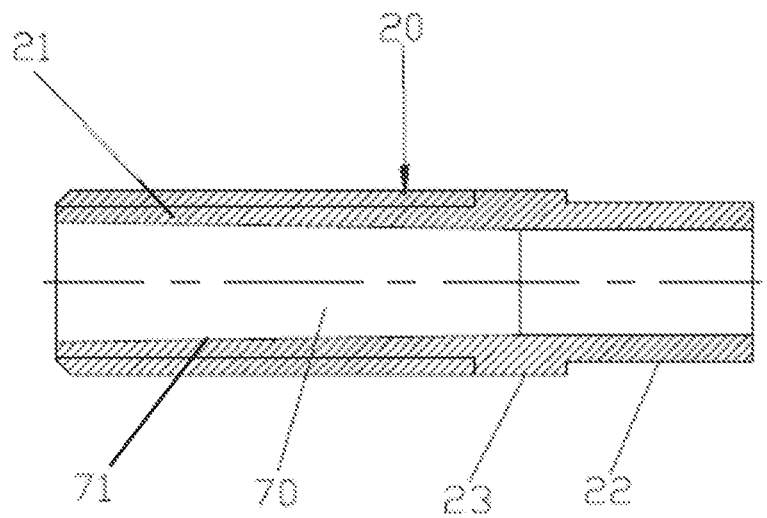
FIG. 3 is a sectional schematic diagram showing the screw bushing of Embodiment 1 of the present invention.
Figure 4:
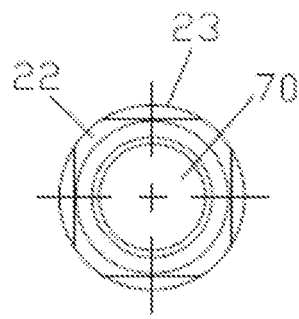
FIG. 4 is a left view of the screw bushing of Embodiment 1 of the present invention.
Figure 8:
FIG. 8 is a structural schematic diagram showing the spoke body of Embodiment 1 of the present invention, namely, producing the spoke body in Step 1 of the manufacturing method.

A manufacturing method of a carbon fiber spoke includes:

Step 1, performing pultrusion on the carbon fiber strip, then grinding to produce the spoke body 10 shown in FIG. 8, and the screw bushing 20 and nut cap bushing 30 as shown in FIGS. 3 to 5. The production efficiency of carbon fiber spoke can be improved obviously by pultrusion process.

Figure 9:
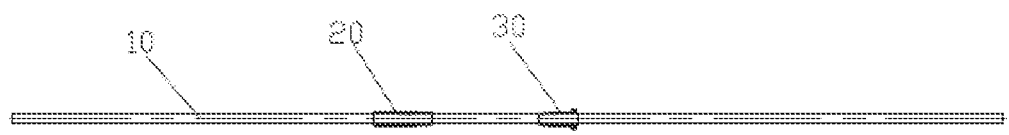
FIG. 9 is a structural schematic diagram showing that a screw bushing and a nut cap bushing are sleeved on a spoke body in Embodiment 1 of the present invention, namely, sleeving a screw bushing and a nut cap bushing on the spoke body in Step 2 of the manufacturing method.

Step 2, referring to FIG. 9, sleeving the screw bushing 20 and the nut cap bushing 30 on the spoke body 10 at the end part.

Figure 10:
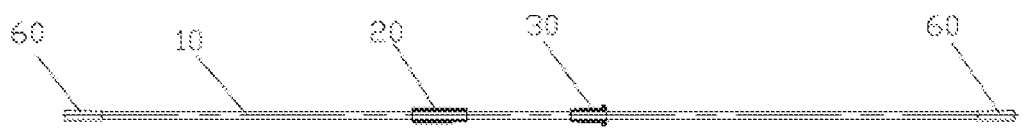
FIG. 10 is a structural schematic diagram showing the spoke body is processed with the solid joint in Embodiment 1 of the present invention, namely, processing the spoke body to obtain the solid joint in Step 3 of the manufacturing method.

Step 3, referring to FIG. 10, forming solid joint parts that are fixedly sleeved on the end parts of the spoke body by gauzing and solidification of the end parts of the spoke body 10. A solid joint 60 is formed by a material removal processing method. The material removal processing method can be grinding.

Figure 11:
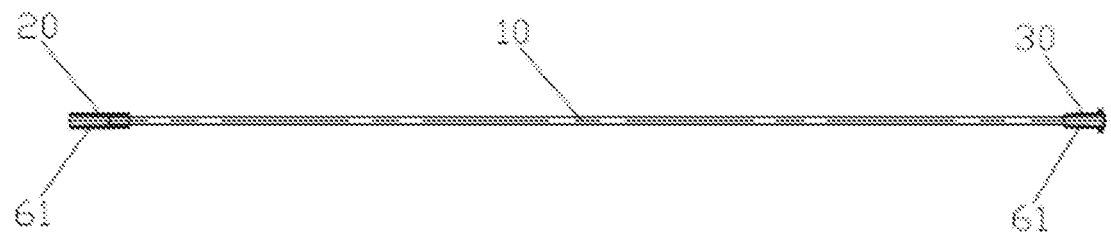
FIG. 11 is a sectional schematic diagram of the spoke body in Embodiment 1 of the present invention, namely, a schematic diagram of fixedly sleeving the nut cap bushing and the screw bushing on the solid joint in Step 4 of the manufacturing method.
Figure 12:
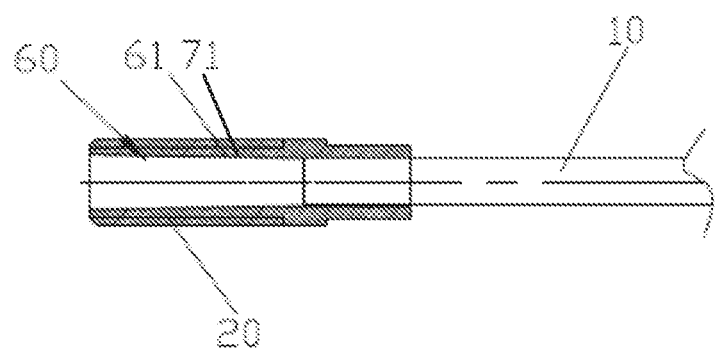
FIG. 12 is a first partial enlarged view of FIG. 11.
Figure 13:
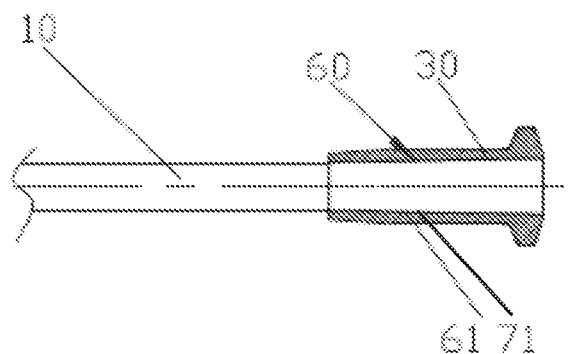
FIG. 13 is a second partial enlarged view of FIG. 11.

Step 4, referring to FIG. 11, moving the screw bushing 20 and the nut cap bushing 30 so that the mounting hole 70 of the screw bushing 20 and the mounting hole 70 of the nut cap bushing 30 are fixedly connected respectively to the two solid joints 60. The second tapered section 71 of the mounting hole 70 is matched with the first tapered section 61 of the solid joint 60.

A carbon fiber spoke of the present invention is formed.

The above-mentioned spoke body 10 is a bar with the same cross section, such as a cylindrical rod.

Embodiment 2

Referring to FIG. 1, FIG. 2, FIGS. 14 to 16, and FIGS. 20 to 22, a carbon fiber spoke includes a spoke body 10, a screw bushing 20 that can be fit and connected with rim 40 and a nut cap bushing 30 that can be fit and connected with the hub 50. The spoke body 10 is made of carbon fiber. The screw bushing 20 and the nut cap bushing 30 are made of stainless steel. The spoke body 10 is a cylindrical structure, and two end parts of the spoke body 10 are fixedly provided with solid joints 60. The screw bushing 20 and the nut cap bushing 30 are provided with penetrable mounting holes 70.

The difference of Embodiment 2 from Embodiment 1 is that the outside surface of the solid joint 60 is inside and outside arranged with a first tapered section 61 with a small diameter close to the spoke body and a large diameter away from the spoke body and a first rotator section that is connected to the large diameter end of the first tapered section 61. The minimum outer diameter of the first tapered section 61 is larger than the outer diameter of the cylindrical structure of the spoke body 10, and the first step surface 62 is formed on the solid joint 60 by the outer diameter difference. The outer diameter of the first rotator section is equal to or less than the maximum outer diameter of the first tapered section 61. The first step surfaces 62 of the two solid joints 60 are arranged face to face. The first rotator section of the solid joint 60 includes a first cylindrical section 64. The outer diameter of the first cylindrical section 64 is smaller than the maximum outer diameter of the first tapered section 61. A third tapered section 63 is connected between the first tapered section 61 and the first cylindrical section 64. The included angle between the rotating line and the central axis of the first tapered section 61 is 0.5-5 degree, such as 1 degree. The two end parts of the spoke body 10 are both wrapped by gauze carbon prepreg and solidified to form the solid joint parts that are fixedly sleeved on the end parts of the spoke body. A solid joint 60 is formed by a material removal processing method.

The hole wall surrounding the mounting hole 70 is provided with a second rotator section 73 and a second tapered section 71 that the inner diameter increases from near to far relative to the second revolution section 73. The second rotator section 73 is a second cylindrical section. The minimum inner diameter of the second tapered section 71 is larger than inner diameter of the second cylindrical section, and a second step surface 72 is formed on the mounting hole 70 by the outer diameter difference. The second rotator section 73 is matched with the cylindrical structure of the spoke body 10. The second tapered section 71 is matched with the solid joint 60. The matching is as follows: the taper angle of the first tapered section 61 is equal to the taper angle of the second tapered section 71, or, the taper angle of the second tapered section 71 is slightly smaller than the taper angle of the first tapered section 61.

The second rotator sections 73 of the mounting holes 70 of the screw bushing 20 and the nut cap bushing 30 are sleeved on the spoke body 10, and the second tapered section 71 is sleeved on the first tapered section 61 of the solid joint 60. The first step surface 62 and the second step surface 72 are jointed together. The mounting hole 70 of the screw bushing 20, the mounting hole 70 of the nut cap bushing 30 and the two solid joints 60 are respectively sleeved together in a tight fit to form a fixed sleeve connection. The inner diameter of the second rotator section is equal to or larger than the cylindrical section of the spoke body. According to the need, a little larger diameter is better, which makes the second rotator section and the cylindrical section in a loose fit.

During the usage, the forces that the rim 40 and the hub 50 respectively exert on the screw bushing 20 and the nut cap bushing 30 are both tensile forces. First, the tensile forces make the second tapered section 71 subjected to an outward acting force relative to the first tapered section 61. The acting force makes a higher tightness between the solid joint and the screw bushing or the nut cap bushing and a firmer connection, which can avoid the separation of the solid joint from the nut cap bushing or the screw bushing. Second, because the first step surface 62 and the second step surface 72 are jointed together, the screw bushing 20 and the nut cap bushing 30 are also prevented from breaking and damaging caused by excessive tensile forces. Third, the part of the mounting hole 70 close to the end of the spoke body is also matched with the first rotator section. The outer diameter of the first rotator section is equal to or less than outer diameter of the first tapered section 61, thus the part of the mounting hole 70 close to end of the spoke body will rebound partly, which can also prevent the screw bushing 20 and the nut cap bushing 30 from breaking and damaging caused by excessive tensile forces. Fourth, adopting this structure, the carbon fiber spokes with different lengths can be produced accurately.

Figure 14:
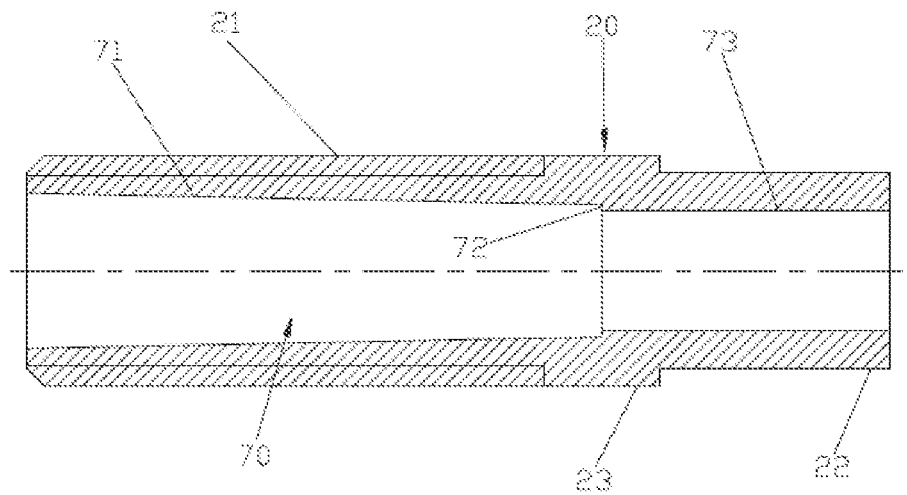
FIG. 14 is a sectional schematic diagram showing the screw bushing of Embodiment 2 of the present invention.
Figure 15:
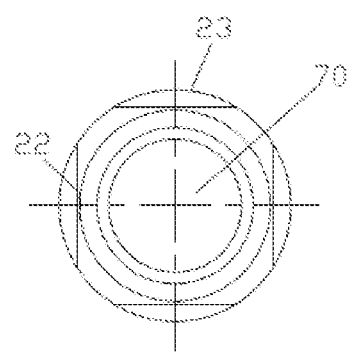
FIG. 15 is a left view of the screw bushing of Embodiment 2 of the present invention.
Figure 16:
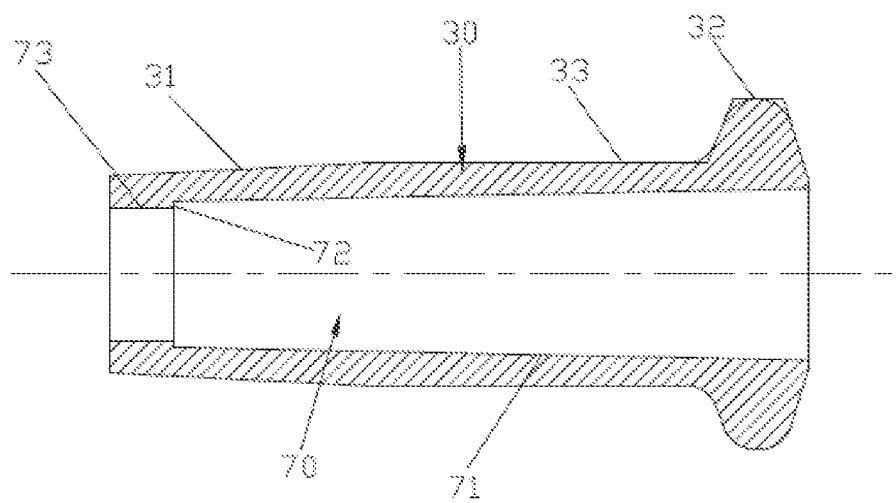
FIG. 16 is a sectional schematic diagram showing the nut cap bushing of Embodiment 2 of the present invention.
Figure 17:
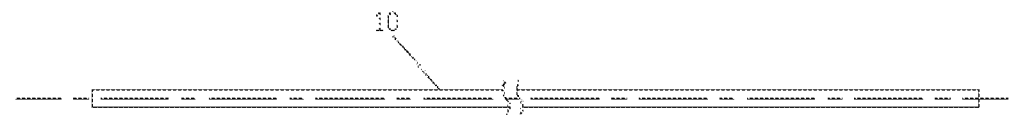
FIG. 17 is a structural schematic diagram showing the spoke body of Embodiment 2 of the present invention, namely, producing the spoke body in Step 1 of the manufacturing method.

A manufacturing method of a carbon fiber spoke includes:

Step 1, performing pultrusion on the carbon fiber strip, then grinding to obtain a spoke body 10 of FIG. 17, and the screw bushing 20 and nut cap bushing 30 of FIGS. 14 to 16. The production efficiency of carbon fiber spoke can be improved obviously by pultrusion process.

Figure 18:
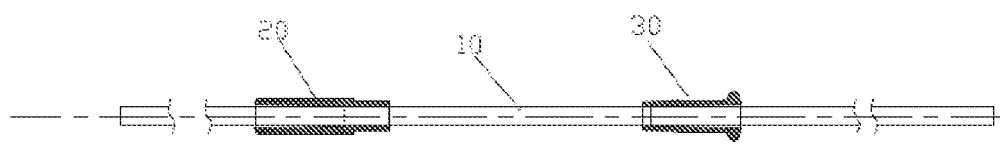
FIG. 18 is a structural schematic diagram showing that a screw bushing and a nut cap bushing are sleeved on a spoke body in Embodiment 2 of the present invention, namely, sleeving a screw bushing and a nut cap bushing on the spoke body in Step 2 of the manufacturing method.

Step 2, referring to FIG. 18, sleeving the screw bushing 20 and the nut cap bushing 30 on the spoke body 10 at the end part.

Figure 19:
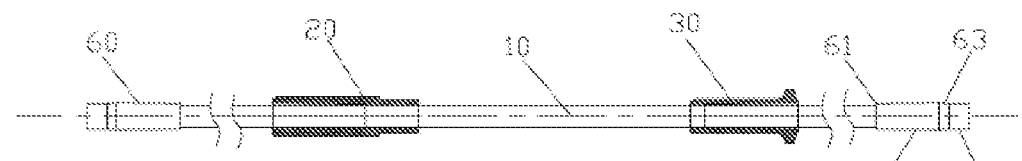
FIG. 19 is a structural schematic diagram showing the spoke body is processed with the solid joint in Embodiment 2 of the present invention, namely, processing the spoke body to obtain the solid joint in Step 3 of the manufacturing method.
Figure 20:
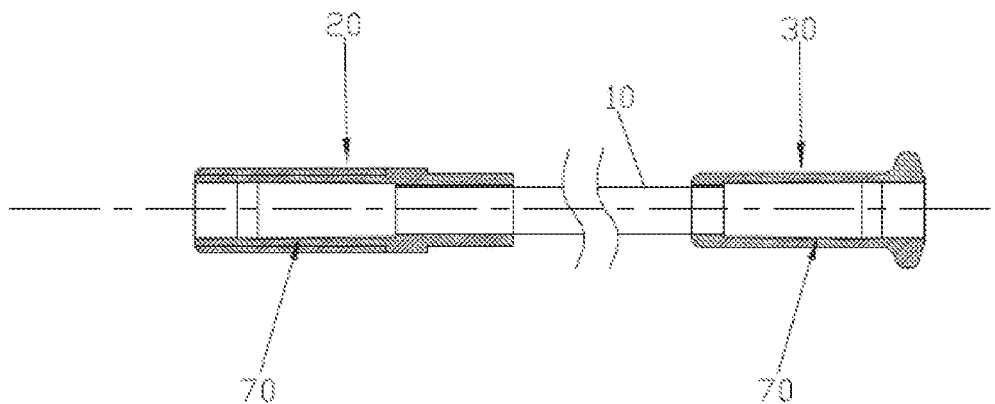
FIG. 20 is a sectional schematic diagram of the spoke body in Embodiment 2 of the present invention, namely, a schematic diagram of fixedly sleeving the nut cap bushing and the screw bushing on the solid joint in Step 4 of the manufacturing method.

Step 3, referring to FIG. 19, forming solid joint parts that are fixedly sleeved on the end parts of the spoke body by gauzing and solidification of the end parts of the spoke body 10. A solid joint 60 is formed by a material removal processing method. The material removal processing method can be grinding.

Figure 21:
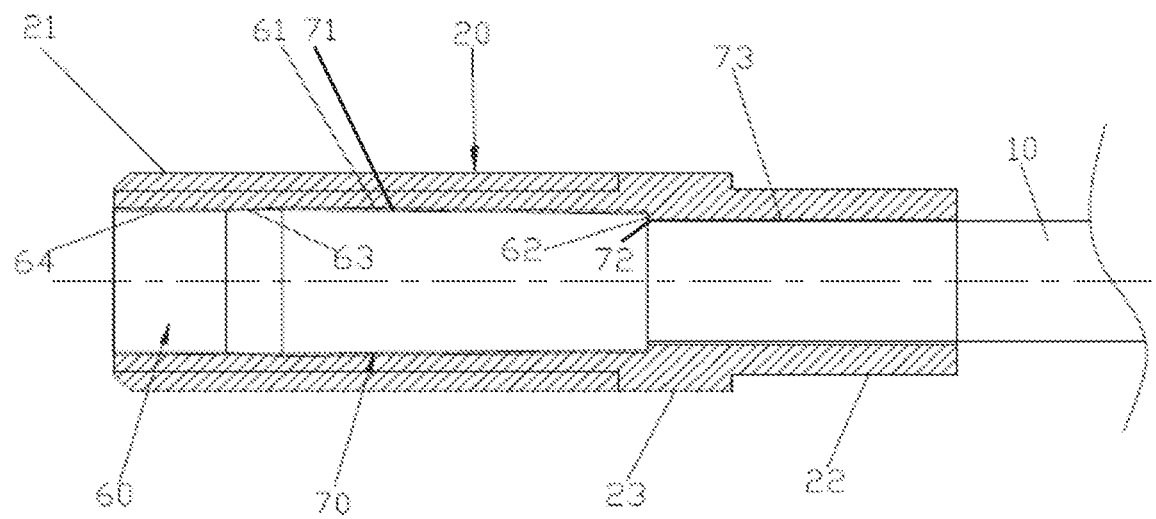
FIG. 21 is a first partial enlarged view of FIG. 20.
Figure 22:
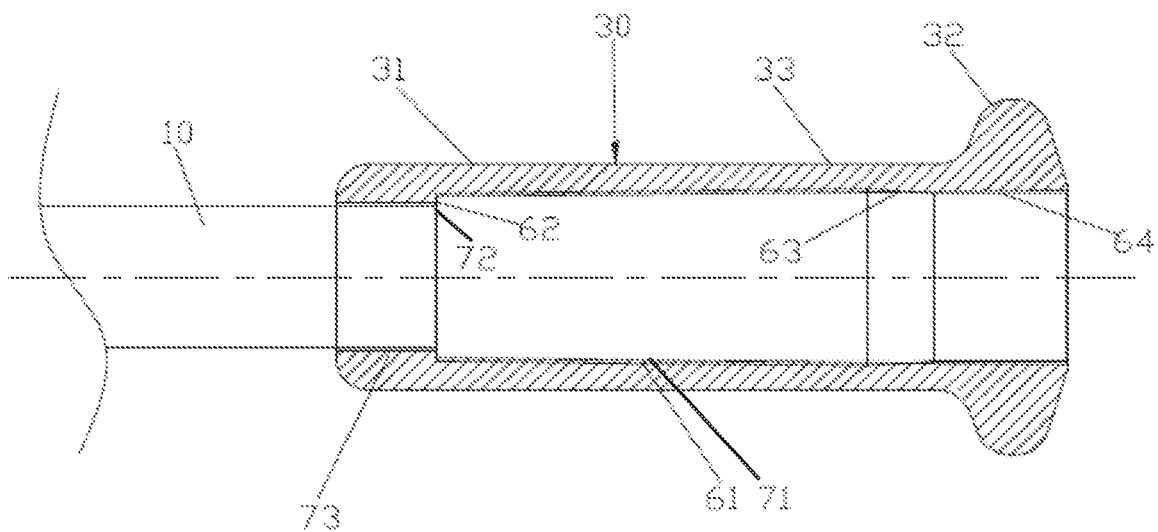
FIG. 22 is a second partial enlarged view of FIG. 20.

Step 4, referring to FIG. 21, moving the screw bushing 20 and the nut cap bushing 30 so that the second rotator sections of the mounting holes 70 of the screw bushing 20 and the nut cap bushing 30 are fit and connected with the spoke body, and the second tapered section is fit and connected respectively with the two solid joints 60, so that the spoke body, the screw bushing and the nut cap bushing are fixed together.

The above-mentioned are only the preferred embodiments of the present invention, so the scope of the implementation of the present invention cannot be defined according to the embodiments, that is, the equivalent changes and modifications made according to the scope of the present invention and the contents of the description should belong to the scope of the present invention.

The present invention relates to a carbon fiber spoke and a manufacturing method thereof, the carbon fiber spoke includes a spoke body made of carbon fiber, a screw bushing that can be fit and connected with rim and a nut cap bushing that can be fit and connected with the hub. Two end parts of the spoke body are fixedly provided with solid joints. The forces that the rim and the hub respectively exert on the screw bushing and the nut cap bushing are both tensile forces, which make the second tapered section subjected to an outward acting force relative to the first tapered section. The acting force makes a higher tightness between the solid joint and the screw bushing or the nut cap bushing and a firmer connection, which can avoid the separation of the solid joint from the nut cap bushing or the screw bushing, and can solve the problem that the testing screw bushing of carbon fiber spoke is pulled out.

What is claimed is:

1. A carbon fiber spoke, comprising a spoke body made of carbon fiber, a screw bushing fitted and connected with a rim and a nut cap bushing fitted and connected with a hub, wherein a first end part and a second end part of the spoke body are respectively fixedly provided with a solid joint; an outside surface of the solid joint is provided with a first tapered section with a first diameter and a second diameter, wherein the first diameter is smaller than the second diameter; the screw bushing and the nut cap bushing are provided with mounting holes, wherein a hole wall surrounding the mounting hole is provided with a second tapered section; the mounting hole of the screw bushing and the mounting hole of the nut cap bushing are respectively fixed to the solid joint on the first end part and the second end part of the spoke body; the second tapered section of the mounting hole and the first tapered section of the solid joint are fit and connected together;

wherein the outside surface of the solid joint is provided with a first rotator section connected with the first tapered section; an outer diameter of the first rotator section is equal to or less than a maximum outer diameter of the first tapered section; the hole wall of the mounting hole is provided with a second rotator section connected with the second tapered section;

wherein a minimum outer diameter of the first tapered section is larger than an outer diameter of the spoke body, and a first step surface is formed on the solid joint by an outer diameter difference; a minimum inner diameter of the second tapered section is larger than an inner diameter of the second rotator section, and a second step surface is formed on the mounting hole by the outer diameter difference; the first step surface and the second step surface are jointed together.

2. The carbon fiber spoke of according to claim 1, wherein the first tapered section and the second tapered section are truncated cone walls.

3. The carbon fiber spoke of claim 1, wherein the outside surface of the solid joint forms the first tapered section the hole wall of the mounting hole forms the second tapered section.

4. The carbon fiber spoke of claim 1, wherein the first rotator section comprises a first cylindrical section; an outer diameter of the first cylindrical section is equal to or less than the maximum outer diameter of the first tapered section.

5. The carbon fiber spoke of claim 1, wherein the first rotator section comprises a third tapered section with a third diameter and a fourth diameter, wherein the third diameter is smaller than the fourth diameter.

6. The carbon fiber spoke of claim 1, wherein the first rotator section comprises a first cylindrical section; an outer diameter of the first cylindrical section is smaller than the maximum outer diameter of the first tapered section; a third tapered section is connected between the first tapered section and the first cylindrical section.

7. The carbon fiber spoke of claim 1, wherein the first end part and the second end part of the spoke body form solid joint parts fixedly sleeved on the end parts of the spoke body; the solid joint is formed from the solid joint part through a material removal processing method.

8. The carbon fiber spoke of claim 1, wherein the mounting hole of the screw bushing, the mounting hole of the nut cap bushing and the first end part and the second end part are respectively sleeved together to form a fixed sleeve connection.

9. The carbon fiber spoke of claim 1, wherein the screw bushing and nut cap bushing are made of stainless steel.

10. A manufacturing method of a carbon fiber spoke, comprising:
Step 1, producing a spoke body made of carbon fiber, a screw bushing fitted and connected with a rim and a nut cap bushing fitted and connected with a hub; the screw bushing and the nut cap bushing are provided with mounting holes; a hole wall surrounding the mounting hole is provided with a second tapered section;
Step 2, sleeving the screw bushing and the nut cap bushing from a first end part and a second end part of the spoke body;
Step 3, fixedly arranging a solid joint at the first end part and the second end part of the spoke body; an outside surface of the solid joint is provided with a first tapered section with a first diameter and a second diameter, wherein the first diameter is smaller than the second diameter;
Step 4, moving the screw bushing and the nut cap bushing so that the mounting hole of the screw bushing and the mounting hole of the nut cap bushing are respectively fixedly sleeved on the solid joint on a first end part and a second end part of the spoke body; the second tapered section of the mounting hole and the first tapered section of the solid joint are fit and connected together;
wherein in Step 3, the first end part and the second end part of the spoke body are solidified to form a solid joint part that is fixedly sleeved on the first end part and the second end part of the spoke body; the solid joint is formed from the solid joint part through a material removal processing method.

11. The manufacturing method of the carbon fiber spoke of claim 10, wherein the first tapered section and the second tapered section are truncated cone walls.

12. The manufacturing method of the carbon fiber spoke of claim 10, wherein the outside surface of the solid joint forms the first tapered section; the hole wall of the mounting hole forms the second tapered section.

13. The manufacturing method of the carbon fiber spoke of claim 10, wherein, in Step 1, the hole wall of the mounting hole is provided with a second rotator section; in Step 3, the outside surface of the solid joint is provided with a first rotator section; an outer diameter of the first rotator section is equal to or less than a maximum outer diameter of the first tapered section.

14. The manufacturing method of the carbon fiber spoke of claim 13, wherein a minimum outer diameter of the first tapered section is larger than an outer diameter of the spoke body, and a first step surface is formed on the solid joint by an outer diameter difference; a minimum inner diameter of the second tapered section is larger than an inner diameter of the second rotator section, and a second step surface is formed on the mounting hole by the outer diameter difference; the first step surface and the second step surface are jointed together.

15. The carbon fiber spoke of claim 2, wherein the mounting hole of the screw bushing, the mounting hole of the nut cap bushing and the first end part and the second end part are respectively sleeved together to form a fixed sleeve connection.

16. The carbon fiber spoke of claim 3, wherein the mounting hole of the screw bushing, the mounting hole of the nut cap bushing and the first end part and the second end part are respectively sleeved together to form a fixed sleeve connection.

17. The carbon fiber spoke of claim 1, wherein the mounting hole of the screw bushing, the mounting hole of the nut cap bushing and the first end part and the second end part are respectively sleeved together to form a fixed sleeve connection.

* * * * *